(12) United States Patent
Vaidyanathan et al.

(10) Patent No.: US 11,767,445 B2
(45) Date of Patent: Sep. 26, 2023

(54) PRE-TREATMENTS FOR PACKAGING PRINT MEDIA

(71) Applicant: Hewlett-Packard Development Company, L.P., Spring, TX (US)

(72) Inventors: Rajasekar Vaidyanathan, San Diego, CA (US); Jason Swei, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/417,519

(22) PCT Filed: Sep. 12, 2019

(86) PCT No.: PCT/US2019/050798
§ 371 (c)(1),
(2) Date: Jun. 23, 2021

(87) PCT Pub. No.: WO2021/050071
PCT Pub. Date: Mar. 18, 2021

(65) Prior Publication Data
US 2022/0194109 A1 Jun. 23, 2022

(51) Int. Cl.
*C09D 129/04* (2006.01)
*C09D 7/63* (2018.01)
(Continued)

(52) U.S. Cl.
CPC .......... *C09D 129/04* (2013.01); *B32B 29/005* (2013.01); *B32B 29/08* (2013.01);
(Continued)

(58) Field of Classification Search
CPC ...... C09D 129/04; C09D 7/63; C09D 175/04; C09D 191/06; B32B 29/005; B32B 29/08;
(Continued)

(56) References Cited

U.S. PATENT DOCUMENTS 6,585,365 B1 7/2003 MacMillan
8,765,852 B1 7/2014 Swei et al.
(Continued)

FOREIGN PATENT DOCUMENTS

EP 1511634 B1 8/2006
JP 2018114748 A 7/2018
(Continued)

*Primary Examiner* — Kelechi C Egwim
(74) *Attorney, Agent, or Firm* — HP Inc. Patent Department

(57) ABSTRACT

A pre-treatment coating composition includes evaporable liquid vehicle and a pre-treatment coating matrix, including from 30 wt % to 70 wt % multivalent organic salt, from 5 wt % to 30 wt % dispersed polyurethane binder having a weight average molecular weight from 30,000 Mw to 100,000 Mw, from 0.5 wt % to 8 wt % of a high molecular weight polyvinyl alcohol binder, and from 10 wt % to 30 wt % of a low molecular weight polyvinyl alcohol binder. The low molecular weight polyvinyl alcohol binder and the high molecular weight polyvinyl alcohol binder are present in the pre-treatment coating matrix at a 3:1 to 15:1 weight ratio, and weight percentages are based on dry weight of the pre-treatment coating matrix.

15 Claims, 6 Drawing Sheets

(51) Int. Cl.
  *C09D 175/04* (2006.01)
  *C09D 191/06* (2006.01)
  *B32B 29/08* (2006.01)
  *C08L 75/04* (2006.01)
  *C08L 91/06* (2006.01)
  *B41M 5/52* (2006.01)
  *B32B 29/00* (2006.01)
  *B41M 5/00* (2006.01)

(52) U.S. Cl.
  CPC ........ *B41M 5/0017* (2013.01); *B41M 5/5218* (2013.01); *C08L 75/04* (2013.01); *C08L 91/06* (2013.01); *C09D 7/63* (2018.01); *C09D 175/04* (2013.01); *C09D 191/06* (2013.01); *B32B 2255/12* (2013.01); *B32B 2255/26* (2013.01); *B32B 2439/62* (2013.01); *B41M 5/5254* (2013.01); *B41M 5/5272* (2013.01); *B41M 5/5281* (2013.01); *C08L 2205/035* (2013.01)

(58) Field of Classification Search
  CPC ............ B32B 2255/12; B32B 2255/26; B32B 2439/62; B41M 5/5254; B41M 5/5272; B41M 5/5281; B41M 5/0017; B41M 5/5218; C08L 75/04; C08L 91/06; C08L 2205/035
  USPC ........................................................ 524/400
  See application file for complete search history.

(56) References Cited

U.S. PATENT DOCUMENTS

| | | |
|---|---|---|
| 8,789,936 B2 | 7/2014 | Mubarekyan |
| 9,278,569 B2 | 3/2016 | Pal et al. |
| 9,421,809 B2 | 8/2016 | Niu et al. |
| 9,505,938 B2 | 11/2016 | Niu et al. |
| 9,873,279 B2 | 1/2018 | Niu et al. |
| 10,071,585 B2 | 9/2018 | Swei et al. |
| 10,272,709 B2 | 4/2019 | Niu et al. |
| 10,286,710 B2 | 5/2019 | Niu et al. |
| 10,399,375 B2 | 9/2019 | Niu et al. |
| 10,414,937 B2 | 9/2019 | Swei et al. |
| 10,759,963 B2 | 9/2020 | Niu et al. |
| 2004/0258856 A1 | 12/2004 | Ylitalo et al. |
| 2009/0295893 A1 | 12/2009 | Akiyama et al. |
| 2011/0024321 A1 | 2/2011 | Tilton |
| 2015/0105504 A1 | 4/2015 | Verheggen et al. |
| 2015/0352877 A1* | 12/2015 | Niu .................. D21H 19/18 524/436 |
| 2017/0361626 A1 | 12/2017 | Pal et al. |
| 2018/0015764 A1 | 1/2018 | Zhou et al. |
| 2018/0086935 A1 | 3/2018 | Niu et al. |
| 2018/0087222 A1* | 3/2018 | Niu .................. D21H 19/20 |
| 2018/0290472 A1* | 10/2018 | Niu .................. C09D 129/04 |
| 2018/0312717 A1* | 11/2018 | Niu .................. D21H 19/24 |
| 2019/0048225 A1 | 2/2019 | Niu et al. |
| 2019/0322895 A1 | 10/2019 | Niu et al. |

FOREIGN PATENT DOCUMENTS

| | | |
|---|---|---|
| WO | WO-2011159371 A1 | 12/2011 |
| WO | WO-2017039586 A1 | 3/2017 |
| WO | WO-2017217997 A1 | 12/2017 |
| WO | WO-2019126042 A1 | 6/2019 |
| WO | WO-2019204880 A1 | 10/2019 |

* cited by examiner

500 ⟶

┌─ 510
coating a first side of media substrate with a pre-treatment coating composition, the pre-treatment coating composition comprising an evaporable liquid vehicle and a pre-treatment coating matrix carried within the evaporable liquid vehicle, the pre-treatment coating matrix, comprising from 30 wt% to 70 wt% multivalent organic salt, from 5 wt% to 30 wt% dispersed polyurethane binder having a weight average molecular weight from 30,000 Mw to 100,000 Mw, from 0.5 wt% to 8 wt% of a high molecular weight polyvinyl alcohol binder, and from 10 wt% to 30 wt% of a low molecular weight polyvinyl alcohol binder, wherein the low molecular weight polyvinyl alcohol binder and the high molecular weight polyvinyl alcohol binder are present in the pre-treatment coating matrix at a 3:1 to 15:1 weight ratio, and wherein weight percentages are based on dry weight of the pre-treatment coating matrix ┌─ 520
drying the pre-treatment coating composition to remove evaporable liquid vehicle therefrom to form a pre-treatment matrix layer on the printing side

FIG. 5

PRE-TREATMENTS FOR PACKAGING PRINT MEDIA

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection or piezoelectric pressure or oscillation onto the surface of a media. Though inkjet printing is versatile, with certain types of harsh printing and processing applications, there can be challenges related to inkjet or digital printing technology. Furthermore, there are some types of printing where the printed matter may be handled vigorously or may be exposed to harsh environmental conditions, such as is often the case with printable packaging.

BRIEF DESCRIPTION OF THE DRAWINGS

FIG. 5 depicts a flow chart of an example method in accordance with the present disclosure;

DETAILED DESCRIPTION

Figure 1:
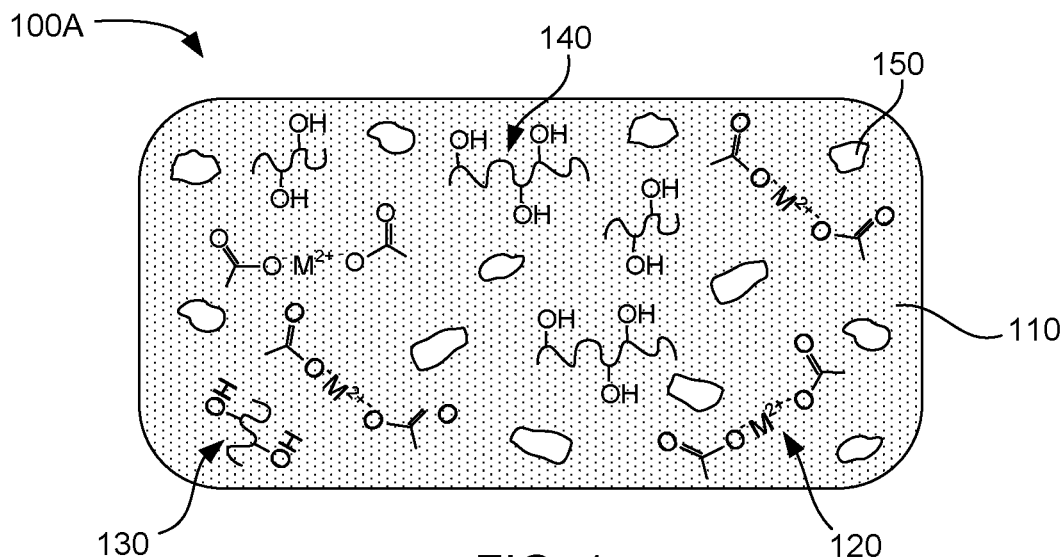
FIG. 1 is a schematic view of an example pre-treatment coating composition in accordance with the present disclosure.

With printed packaging, particularly where corrugation and other packaging where printed indicia may be exposed to harsh environmental or package assembly conditions, achieving and retaining acceptable print quality using inkjet printing technologies can present difficulties. For example, the preparation of corrugated boards with printed indicia or matter may use high temperatures and pressures, and may undergo mechanical scraping during the corrugation process within many types of corrugation devices, e.g., the corrugation process can include dragging a print surface over hot plates with temperatures ranging from about 300° F. to 400° F. Inkjet or digital printing can bring processing advantages to packaging printing, including corrugated packaging printing, foldable package printing, etc. To illustrate, with analog printing such as lithographic or flexographic printing, for practical purposes, every image utilizes a specific plate or a single plate (or even a small number of plates for some variation), resulting in higher printing cost for a small volume printing job. On the other hand, with digital printing, every image can be different. This allows for any level of versioning or customization of a packaging print job.

In accordance with this, a pre-treatment coating composition includes an evaporable liquid vehicle and a pre-treatment coating matrix carried within the evaporable liquid vehicle. The pre-treatment coating matrix in this example includes from 30 wt % to 70 wt % multivalent organic salt, from 5 wt % to 30 wt % dispersed polyurethane binder having a weight average molecular weight from 30,000 Mw to 100,000 Mw, from 0.5 wt % to 8 wt % of a high molecular weight polyvinyl alcohol binder, and from 10 wt % to 30 wt % of a low molecular weight polyvinyl alcohol binder. The low molecular weight polyvinyl alcohol binder and the high molecular weight polyvinyl alcohol binder are present in the pre-treatment coating matrix at a 3:1 to 15:1 weight ratio. Weight percentages in this example are based on dry weight of the pre-treatment coating matrix. In one example, the multivalent organic salt includes a divalent metal selected from calcium, magnesium, iron, aluminum, zinc, or a mixture thereof, and wherein the multivalent organic salt includes an organic anion having the formula $RCOO^-$, where R is hydrogen or a C1 to C12 saturated hydrocarbon. The organic anion can be, for example, an acetate anion, a propionate anion, or a combination thereof. The dispersed polyurethane binder can have a weight average molecular weight from 40,000 Mw to 70,000 Mw. The pre-treatment coating matrix can likewise be devoid of wax. In further detail, the pre-treatment coating composition can include a block copolymer surfactant that stabilizes components of the pre-treatment coating matrix by steric hindrance, and can have a weight average molecular weight from 4,000 Mw to 12,000 Mw with an acid value from 5 mg KOH/g to 30 mg KOH/g.

In another example, a packaging print medium includes a media substrate including a first side and a second side, and a pre-treatment matrix layer on a first side of the media substrate. The pre-treatment matrix layer in this example includes from 30 wt % to 70 wt % multivalent organic salt, from 5 wt % to 30 wt % dispersed polyurethane binder having a weight average molecular weight from 30,000 Mw to 100,000 Mw, from 0.5 wt % to 8 wt % of a high molecular weight polyvinyl alcohol binder, and from 10 wt % to 30 wt % of a low molecular weight polyvinyl alcohol binder. The low molecular weight polyvinyl alcohol binder and the high molecular weight polyvinyl alcohol binder are present in the pre-treatment matrix later at a 3:1 to 15:1 weight ratio. Weight percentages in this example are based on dry weight of the pre-treatment matrix layer. The multivalent organic salt can include a divalent metal selected from calcium, magnesium, iron, aluminum, zinc, or a mixture thereof. The multivalent organic salt can likewise include an organic anion having the formula RCOO⁻, where R is hydrogen or a C1 to C12 saturated hydrocarbon. The polyurethane binder can be a high molecular weight polyurethane polymer having a weight average molecular weight from 30,000 Mw to 100,000 Mw. The pre-treatment matrix layer can be devoid of wax in one example. The print media can be attached, for example, to a corrugated flute having a support side attached to the second side of the media substrate and a base-attachment side attached to base paper. Thus, the packaging print medium can be in the form of a corrugated print medium that has been treated under heat and pressure, or can be another type of packaging, for example.

In another example, a method of preparing a packaging print medium includes coating a first side of media substrate with a pre-treatment coating composition, and drying the pre-treatment coating to remove evaporable liquid vehicle therefrom to form the pre-treatment matrix layer on the printing side. The pre-treatment coating composition in this example includes evaporable liquid vehicle and a pre-treatment coating matrix. The pre-treatment coating matrix includes from 30 wt % to 70 wt % multivalent organic salt, from 5 wt % to 30 wt % dispersed polyurethane binder having a weight average molecular weight from 30,000 Mw to 100,000 Mw, from 0.5 wt % to 8 wt % of a high molecular weight polyvinyl alcohol binder, and from 10 wt % to 30 wt % of a low molecular weight polyvinyl alcohol binder. The low molecular weight polyvinyl alcohol binder and the high molecular weight polyvinyl alcohol binder in this example are present in the pre-treatment coating matrix at a 3:1 to 15:1 weight ratio. In one example, the method can include attaching a support side of a corrugated flute to a second side of the media substrate. The method can also include attaching a base paper to a base-attachment side of the corrugated flute. Attaching the support side of the corrugated flute to the second side of the media substrate, or attaching the base paper to the base-attachment side of the corrugated flute, or both, may include applying heat and pressure to the print medium, the corrugated flute, and the base paper. The packaging print medium in this example may alternatively be in the form of a foldable packaging media substrate. In some examples, the method can include applying a varnish overcoat over the pre-treatment matrix layer, such as after printing an image on the pre-treatment matrix layer.

When discussing the coating compositions, print media, and methods herein, these various discussions can be considered applicable to each of these examples, whether or not they are explicitly discussed in the context of that example. Thus, for example, in discussing a dispersed polyurethane binder in a pre-treatment coating composition, such a polyurethane can also be used for the packaging print media and method examples, and vice versa.

It is noted that the term "pre-treatment coating composition" refers to the composition used to form a "pre-treatment matrix layer." Furthermore, to avoid confusion, the pre-treatment coating composition includes an aqueous liquid vehicle, e.g., water or a mixture of water and other volatile liquids that are evaporable therefrom, that carries a "pre-treatment coating matrix," which is the solids or "dry" formulation carried by the liquid vehicle that when dried on a media substrate, forms a "pre-treatment matrix layer." Thus, the term "pre-treatment" is used to describe a coating composition, a coating matrix (carried by the evaporable liquid(s) of the coating composition, and a matrix layer (dried on the media substrate). The solids content of the pre-treatment coating matrix and the pre-treatment matrix layer should be about the same, as both exclude the aqueous liquid vehicle in their calculation. For example, a pre-treatment coating composition includes an evaporable liquid vehicle and a pre-treatment coating matrix (solids of the coating) such that the evaporable liquid vehicle (when evaporated) from the solids, leaves the pre-treatment matrix layer coated on the media substrate. In accordance with this, the evaporable liquid vehicle is not included in weight percent (wt %) calculations for either the coating matrix components or the matrix layer components, e.g., dry weight is provided unless the context dictates otherwise.

In accordance with FIG. 1, a pre-treatment coating composition 100A is shown schematically by example. The structures shown are not to scale, and are merely examples that individually and graphically represent a wider class of structures. As shown, the pre-treatment coating composition includes an aqueous liquid vehicle 110 which includes solids either dispersed or solvated therein. Those solids include, for example, multivalent organic salt 120, low molecular weight polyvinyl alcohol 130, high molecular weight polyvinyl alcohol 140, and dispersed polyurethane binder 150. Regarding the various iterations of the formulations described herein as the pre-treatment coating(s), the ingredients that are selected for use can provide a benefit to the pre-treatment coating composition, e.g., formulation stability, etc., and/or can provide a benefit to the pre-treatment matrix layer that is dried and formed on the media substrate using the pre-treatment coating composition. For example, in the pre-treatment coating composition or the pre-treatment matrix layer formed therefrom (shown in FIG. 2 at 100B), the multivalent organic salt acts as an ink fixer to contribute to the high image quality by preventing color bleed and other visual artifacts when an aqueous ink is printed thereon. It may also increase image quality by keeping the image close to the surface of the pre-treatment coating. Furthermore, the use of a multivalent organic salt (rather than an inorganic salt, such as chloride, bromide, etc.) tends to be less corrosive to some metals, which can be present in various equipment that may come into contact with the pre-treatment coating composition. In further detail, inclusion of the multivalent organic salts described herein can act to stabilize the pre-treatment coating compositions, which in accordance with the present disclosure, can include greater than a 3:1 weight ratio of low molecular weight polyvinyl alcohol to high molecular weight polyvinyl alcohol binder, and can further include dispersed polyurethane particles.

Example multivalent metal salts 120 that can be used include a salt of a multivalent metal and a carboxylate ion such as those present in various organic acids, for example. Examples of multivalent metal cations include divalent metal ions, such as $Ca^{2+}$, $Cu^{2+}$, $Ni^{2+}$, $Mg^{2+}$, $Zn^{2+}$, and/or $Ba^{2+}$; and trivalent metal ions, such as $Al^{3+}$, $Fe^{3+}$, and/or $Cr^{3+}$. In one example, the multivalent metal ion can be $Ca^{2+}$, $Mg^{2+}$ or $Zn^{2+}$. In one aspect, the multivalent metal ion(s) can be $Ca^{2+}$, $Mg^{2+}$, and/or $Al^{3+}$.

Examples of organic anions that can be used include carboxylate having the formula RCOO⁻, where R is hydrogen or a low molecular weight hydrocarbon chain, e.g., C1 to C12. When R is H, the organic salt is a multivalent formate, when R is C1 the organic salt is a multivalent acetate, when R is C2, the multivalent salt is a propionate, and so forth. In a more specific example, the multivalent organic salt 120 can include carboxylated anion derived from saturated aliphatic monocarboxylic acid having 1 to 6 carbon atoms (C1 to C6), or in a still more specific example, the carboxylated anion can be derived from a saturated aliphatic monocarboxylic acid having 1 or 2 carbon atoms, e.g., acetate (C1) or propionate (C2). Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. In other examples, the carboxy or a carbocyclic monocarboxylic acid has 7 to 11 carbon atoms.

In certain more specific examples, the multivalent organic salt 120 can include calcium acetate, calcium propionate, magnesium acetate, magnesium propionate, aluminum acetate, aluminum propionate, zinc acetate, zinc propionate, or a combination thereof.

Regardless of the multivalent organic salt 120 used, whether used singly or as a combination of multivalent organic salts, a total amount of multivalent cationic salt in the pre-coating composition (by dry weight) and in the pre-coating matrix can be from 25 wt % to 75 wt %, from 30 wt % to 70 wt %, or from 35 wt % to 65 wt %, for example. In further detail in examples herein, the multivalent organic salt can be selected that has a solubility (on the basis of anhydrous salt) in water from 15 g multivalent organic salt per 100 mL water (15 g/100 mL solubility) or more, e.g., from 15 g/100 mL to 100 g/100 mL, or from 20 g/100 mL to 75 g/100 mL, or from 25 g/100 mL to 60 g/100 mL). The solubility of the multivalent ion in solution can provide a good mechanism to crash the pigment when an ink composition is applied to the pre-treatment matrix layer, and the multivalence nature of the multivalent metal cation can provide more effective crashing and/or pigment fixation compared to monovalent metal ions.

Thus, with these formulations, images printed on the pre-treatment matrix layer (see 100B of FIG. 2), formed from a pre-treatment coating composition 110A, can be enhanced with respect to both durability and print quality by the presence of the multivalent organic salt 120, as it provides a stable composition including the multiple polyvinyl alcohol binders 130, 140 and a dispersed polyurethane binder 150. As one example, this combination provides good corrugation durability for corrugated packaging applications, which may in some instances further include an over-varnish layer. Durability enhancement on other types of packaging can also be achieved, such as foldable packaging that may not undergo the heat and/or pressure used for preparing corrugated packaging. Furthermore, with respect to image quality, ink compositions printed on the pre-treatment coating matrices of the presence disclosure can exhibit better dot gain, meaning the ink dots printed thereon are slightly larger (with more spreading) so that upon digitally printing, a higher ink density can be achieved compared to print media without the coating or even with some other state of the art coatings. Thus, less ink may be used to achieve an acceptable amount of color when printed on the pre-coating matrix, or alternatively, richer color saturation may be achievable with the same amount of ink compared to uncoated media or media coated with some other state of the art coatings.

In further detail regarding the multiple polyvinyl alcohol (PVA) binders, one binder is the low molecular weight polyvinyl alcohol 130 and the other binder is the high molecular weight polyvinyl alcohol 140. In accordance with examples of the present disclosure, "low molecular weight" polyvinyl alcohol can have a viscosity from 2.5 mPa·s to 7 mPa·s, from 3 mPa·s to 6 mPa·s, or from 3.5 mPa·s to 4.5 mPa·s. The "high molecular weight" polyvinyl alcohol can have a viscosity from 9 mPa·s to 110 mPa·s, from 10 mPa·s to 60 mPa·s, or from 11.5 mPa·s to 14.5 mPa·s. These molecular weights (e.g., low and high Mw PVA) are thus relative to one another, and can be quantified by viscosity, and in some examples, may further be quantified by weight average molecular weight.

With respect to the use of viscosity to quantify the molecular weight of the polyvinyl alcohols used herein, the viscosities are measured at 20° C. as a 4 wt % polyvinyl alcohol solution in water, as per ISO standard 12058-1:2018 (E), which is a dynamic viscosity standard testing protocol. The viscosity value is expressed in millipascal seconds (mPa·s) using a falling ball viscometer. With this methodology, the apparatus includes an inclined measurement tube (falling-ball tube of thermally aged, calibrated, precision borosilicate glass tubing with a coefficient of linear expansion of $3.3 \times 10^{-6}$) filled with liquid to be tested, e.g., polyvinyl alcohol solution (4 wt % in water at 20° C.). One of six ball is selected, depending on the expected viscosity range (No. 1 and No. 2 balls are appropriate, as the viscosity values collected will range from 0.6 mPa·s to 10 mPa·s (Ball No. 1; 15.81 mm diameter) or from 7 mPa·s to 130 mPa·s (Ball No. 2; 15.60 mm diameter). If both balls return results, the value of the slower moving ball will be used. Equipment used for this test can be a Hoepler viscometer (described in DIN 53015:1978), or equivalent. The measurement tube is marked defining distances of 100 mm, and the tube is jacketed to provide temperature control (at 20° C.) and to provide a 10 degree incline. The ends are plugged, with one end including a capillary joined to a hollow space to avoid pressure fluctuations. The polyvinyl alcohol solution is kept completely within the tube and between the plugs. The travel time of the ball between the two marks is used to determine the viscosity of the fluid, based on formulations and calculations published in ISO standard 12058-1:2018(E).

Regarding weight average molecular weight of the polyvinyl alcohol binders, the "low molecular weight" polyvinyl alcohol binder, in some examples, can be further defined, or alternatively defined, to include polyvinyl alcohol binders with a weight average molecular weight from 15,000 Mw to 60,000 Mw, from 15,000 Mw to 50,000 Mw, from 15,000 Mw to 45,000 Mw, from 20,000 Mw to 60,000 Mw, from 20,000 Mw to 50,000 Mw, from 20,000 Mw to 45,000 Mw, or from 25,000 Mw to 50,000 Mw, for example. The "high molecular weight" polyvinyl alcohol bind can further defined, or alternatively defined herein, to include polyvinyl alcohol binders with a weight average molecular weight from 50,000 Mw to 300,000 Mw, from 60,000 Mw to 300,000 Mw, from 75,000 Mw to 300,000 Mw, from 100,000 Mw to 300,000 Mw, from 50,000 Mw to 200,000 Mw, from 75,000 Mw to 200,000 Mw, or from 100,000 Mw to 250,000 Mw, for example. Notably, as the range of low molecular weight and high molecular weight ranges may overlap in some instances (though the viscosity ranges defining high and low molecular weight above do not overlap), it is noted that these two terms are likewise intended to be relative to one another (low molecular weight is considered to be determined relative to high molecular weight polyvinyl alcohol). Thus, in practice, the ranges for the low and high molecular weight polyvinyl alcohol are not intended to overlap in most instances. Thus, in some examples, irrespective of overlapping overall weight ranges, the low molecular weight polyvinyl alcohol may have a weight average molecular weight from 10,000 Mw to 285,000 Mw lower than the high molecular weight polyvinyl alcohol binder. In a more detailed example, the difference in molecular weight ranges between the low to high molecular weight polyvinyl alcohol can be from 20,000 Mw to 200,000 Mw, or from 30,000 Mw to 150,000 Mw.

The low molecular weight polyvinyl alcohol 130 and the high molecular weight polyvinyl alcohol 140 can be present in the pre-coating composition or in the pre-coating matrix at a weight ratio from 3:1 to 15:1, from 4:1 to 15:1, from 5:1 to 15:1, from 3:1 to 10:1, from 4:1 to 10:1, or from 5:1 to 10:1, for example. In one example, the weight ratio of low molecular polyvinyl alcohol to high molecular weight polyvinyl alcohol can be from 6:1 to 8:1.

Examples of polyvinyl alcohol binders 130 and 140 that can be used include partially hydrolyzed polyvinyl alcohol, fully hydrolyzed polyvinyl alcohol, or copolymers including polyvinyl alcohol, provided they are water-soluble. When describing polyvinyl alcohol herein, this can refer to either the low molecular weight polyvinyl alcohol or the high molecular weight polyvinyl alcohol, or to both in a common formulation. Furthermore, for definitional purposes, 98% hydrolyzed polyvinyl alcohol (or greater, based on percentage of alcohol groups present relative to total side groups of both alcohol and acetate groups) is considered to be fully hydrolyzed polyvinyl alcohol. Polyvinyl alcohol that is less than 98% hydrolyzed polyvinyl alcohol is considered to be partially hydrolyzed. In one specific example, the polyvinyl alcohol used can be partially hydrolyzed, and in more specific examples, the polyvinyl alcohol can be partially hydrolyzed at from 80% to 94%. In other examples, the polyvinyl alcohol binders that can be used include water-soluble copolymers of polyvinyl alcohol and other polymeric groups copolymerized therewith, e.g., copolymers of polyvinyl alcohol and poly(ethylene oxide), polyvinyl alcohol and polyvinylamine, cationic polyvinyl alcohol, acetoacetylated polyvinyl alcohol, silyl-modified polyvinyl alcohol, etc. In one example, the polyvinyl alcohol (which includes water-soluble copolymers thereof) can be included at a concentration where it is fully solubilized in the pre-treatment coating compositions, for example.

In further detail regarding the dispersed polyurethane binder 150 in the pre-treatment coating composition, or the polyurethane binder in the pre-treatment coating matrix (or that remains with the pre-treatment matrix layer), these polymer binder particulates may enhance durability by binding the ingredients of the matrix to each other and to the underlying media. In some examples, the polyurethane binder particles can be included to allow ink components to penetrate the matrix, providing a surface morphology for receiving aqueous inkjet ink. Thus, the combination of the high molecular weight polyvinyl alcohol, the low molecular weight polyvinyl alcohol, and the polyurethane can provide good durability, even when exposed to hot (e.g., up to 400° F.) temperatures and mechanically harsh (e.g., mechanical scraping) conditions, such as may be present in corrugators.

The polyurethane binder particles 150 can be used that have a weight average molecular weight (Mw) from 30,000 Mw to 100,000 Mw, from 30,000 Mw to 80,000 Mw, from 30,000 Mw to 70,000 Mw, or from 40,000 Mw to 70,000 Mw, for example. In one specific example, the polyurethane binder particles having a weight average molecular weight from 40,000 Mw to 70,000 Mw can be further characterized to have a number average molecular weight (Mn) from 20,000 Mn to 30,000 Mn and/or a polydispersity from 2.1 to 2.5.

In some examples, the glass transition temperature (Tg) of the polyurethane binder particles can be from 40° C. to 140° C., from 50° C. to 100° C., or from 60° C. to 90° C., for example. Glass transition temperature (Tg) parameters can be measured by Differential Scanning calorimetry (DSC), for example.

In further detail, the D50 particle size of the polyurethane binder particles can be from 10 nm to 1 μm, from 10 nm to 500 nm, from 50 nm to 250 nm, from 50 nm to 200 nm, or from 60 nm to 160 nm, for example. The particle size distribution of the latexes is not particularly limited. However, it is also possible to use two or more distribution sizes of polyurethane binder particles with their own mono-dispersed particle size distribution in combination. As used herein, particle size can refer to a value of the diameter of spherical particles, or in the case of particles that are not spherical, can refer to the equivalent spherical diameter of the volume of that particular particle if reshaped at the same density as a spherical particle. The particle size distribution can be in a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). In these or other types of particle distributions, the particle size can be characterized in one way using the $50^{th}$ percentile of the particle size, sometimes referred to as the "D50" particle size. For example, a D50 value of about 25 μm means that about 50% of the particles (by number) have a particle size greater than about 25 μm and about 50% of the particles have a particle size less than about 25 μm. Whether the particle size distribution is Gaussian, Gaussian-like, or otherwise, the particle size distribution can be expressed in terms of D50 particle size, which may typically approximate average particle size, but may not be the same. In examples herein, the particle size ranges disclosed herein can be modified to "average particle size," providing sometimes slightly different size distribution ranges.

In additional detail, the pre-treatment coatings (and coating matrices) prepared in accordance with the present disclosure can be further enhanced in some examples by adding a surfactant. In one specific example, however, it has been found that some surfactants provide even better performance with respect to image quality and/or durability. As an example, certain surfactants sold under the trade name Disperbyk®, including Disperbyk® 190 as an example, provided better performance than other comparative surfactants. Such example surfactants may be sterically stabilizing for dispersed pre-treatment coating matrix components within the pre-treatment coating composition (e.g., by steric hindrance with their long chain size) polymers having a molecular weight from 4,000 Mw to 12,000 Mw (or from 5,500 Mw to 8,500 Mw). In further detail, the surfactant may have some acid groups that form anionic moieties in the pre-coating compositions (in the presence of the aqueous liquid vehicle or water).

Non-limiting examples of other suitable surfactants include anionic surfactant, nonionic surfactant, cationic surfactant, and combinations thereof. In one example, the surfactant can be a nonionic surfactant. Several commercially available nonionic surfactants that can be used in the formulation of the pre-treatment coating composition include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), and Dynol™ series (e.g. Dynol™ 607 and Dynol™ 604) manufactured by Air Products and Chemicals, Inc.; fluorinated surfactants, such as those from the Zonyl® family (e.g., Zonyl® FSO and Zonyr® FSN surfactants), manufactured by E. I. DuPont de Nemours and Company; Alkoxylated surfactant such as Tego® Wet 510 manufactured from Evonik; fluorinated PolyFox® nonionic surfactants (e.g., PF159 nonionic surfactants), manufactured by Omnova; or combinations thereof. Suitable cationic surfactants that may be used in the pre-treatment coating composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

The surfactant, if present, can be included in the pre-treatment coating composition at from about 0.05 wt % to about 1.5 wt %. In one example, the surfactant can be present in an amount ranging from about 0.1 wt % to about 1 wt %. In one aspect, the surfactant can be present in an amount ranging from about 0.2 wt % to about 0.6 wt %.

Other additives can be added to the pre-treatment coating composition including cross-linkers, defoamers, plasticizers, fillers, stabilizers, dispersants, biocides, optical brighteners, viscosity modifiers, leveling agents, UV absorbers, anti-ozonants, wax, etc. Such additives can be present in the pre-treatment coating compositions in amounts from 0.01 wt % to 20 wt %. However, it is noted that in one specific example, the pre-treatment coating composition (and the pre-treatment matrix layer applied to the media substrate) can be devoid of wax. The term "wax" is defined herein to include both natural waxes and synthetic waxes. Example waxes include petroleum wax, vegetable or plant wax, animal wax, modified plant or animal wax, mineral wax, ceresin wax, montan wax, ozocerite wax, peat wax, paraffin wax, microcrystalline wax, polyethylene wax or polypropylene wax, PTFE wax, polytetrafluoroethylene wax, carnauba wax, bee's wax, paraffin wax, polyamide wax, etc. Furthermore, the binders described herein, such as the polyurethane binder particles, are not considered to be a wax consistent with the present disclosure, as the pre-treatment coating compositions are defined herein to include a polyurethane binder in the form of dispersed particles in the composition or as dispersed particles within the matrix applied and dried on the media substrate.

The pre-treatment coating composition can include these, and in some cases other, solids suspended in an aqueous liquid vehicle, which may be simply water, or may be a combination of water and other evaporable solvents or liquids. That stated, in one example, the aqueous liquid vehicle can be water (or water and any other evaporable liquid components that may be present in the individual components used to formulate the pre-treatment coating composition). Regardless of whether or not there are other evaporable components present or not, the water can be included in the pre-treatment coating composition at from 35 wt % to 90 wt %, from 50 wt %, to 85 wt %, or from 60 wt % to 80 wt %, for example.

Figure 2:
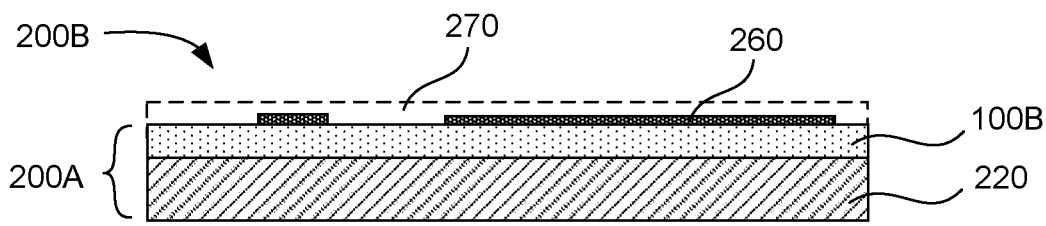
FIG. 2 is a cross-sectional schematic view of the pre-treatment matrix layer applied to a print media substrate and having an ink composition printed thereon in accordance with the present disclosure.

Referring more specifically to FIG. 2, a packaging print medium 200A is shown that includes a pre-treatment coating composition (shown at 100A of FIG. 1) applied to a media substrate 210 to form a pre-treatment matrix layer 100b, where the aqueous liquid vehicle has been evaporated or dried therefrom. It is understood that not 100 wt % of water and/or evaporable solvent is typically removed, as coating layers applied to media tend to retain some moisture, but for purposes of the present disclosure, the pre-treatment matrix layer is considered to be a "dried" coating in a manner suitable for receiving an ink composition when printed thereon.

The media substrate 220 that can be coated with the pre-treatment coating composition and resulting pre-treatment matrix layer 100B can be any substrate that is suitable for receiving the pre-treatment coating composition and which is suitable for use with packaging. The pre-treatment coating composition can include a weight ratio of aqueous liquid vehicle from 1:3 to 10:1, from 1:2 to 9:1, or from 1:1 to 9:1, for example. The aqueous liquid vehicle may be water or may include water and other volatile liquids that evaporate from the media substrate after applying as a coating thereon, e.g., mostly such as less than 10 wt % or less than 7 wt % or less than 5 wt % of the weight of the pre-treatment coating matrix, which is applied as part of the pre-treatment matrix layer on the media substrate after drying. Methods that can be used to apply the coating compositions generally include flexo coating, roll coating, slot-die coating, rod coating such as Mayer rod coating, blade coating, gravure coating, knife-over-roll coating, cascade coating, curtain coating, and the like. Generally, the pre-treatment coating composition can be applied to leave a pre-treatment matrix layer with a basis weight of 0.1 gsm to 10 gsm. In one example, the basis weight can be from 0.5 gsm to 5 gsm, and in one aspect, from 0.5 gsm to 2 gsm. The printed image can be applied, where applied, at from 0.1 gsm to 5 gsm, for example. The varnish overcoat can be applied at from 1 gsm to 3 gsm, for example. These coating weights are based on dry weight of the pre-treatment coating matrix (or layer formed therefrom on the media substrate).

Figure 3:
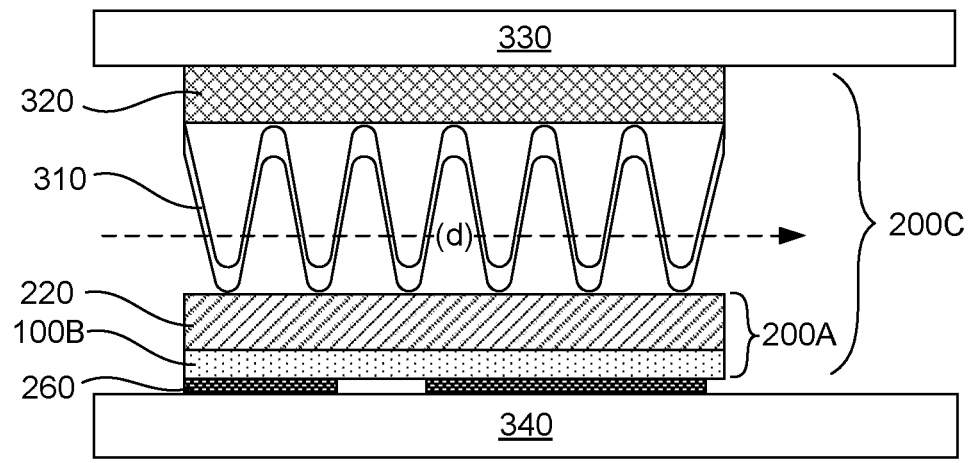
FIG. 3 is a cross-sectional schematic view of an example corrugated packaging print medium in production in accordance with the present disclosure.
Figure 4A:
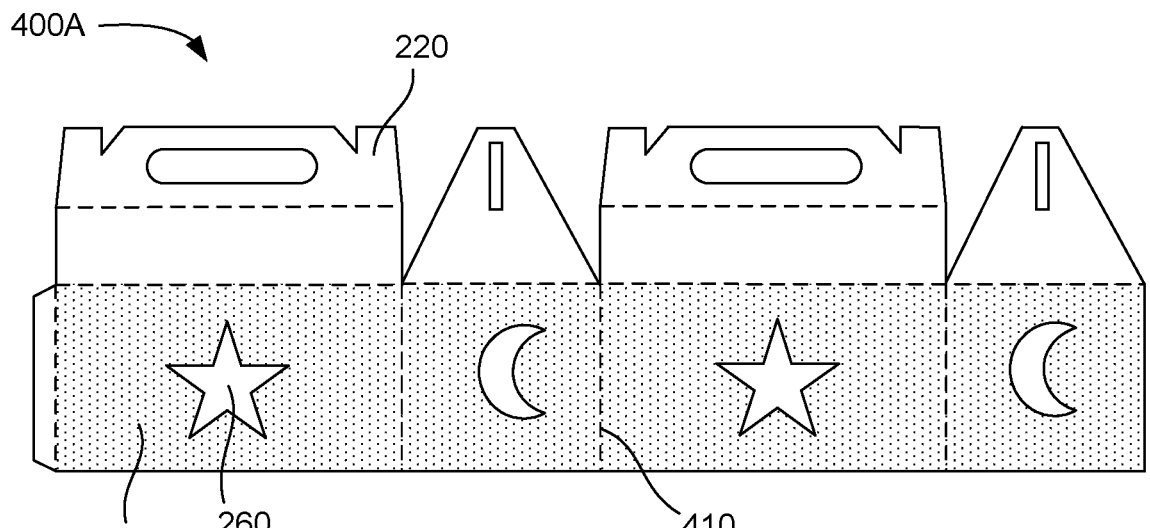
FIG. 4A is a top plan view of an unfolded and scored packaging print medium that is foldable to form a package in accordance with the present disclosure.
Figure 4B:
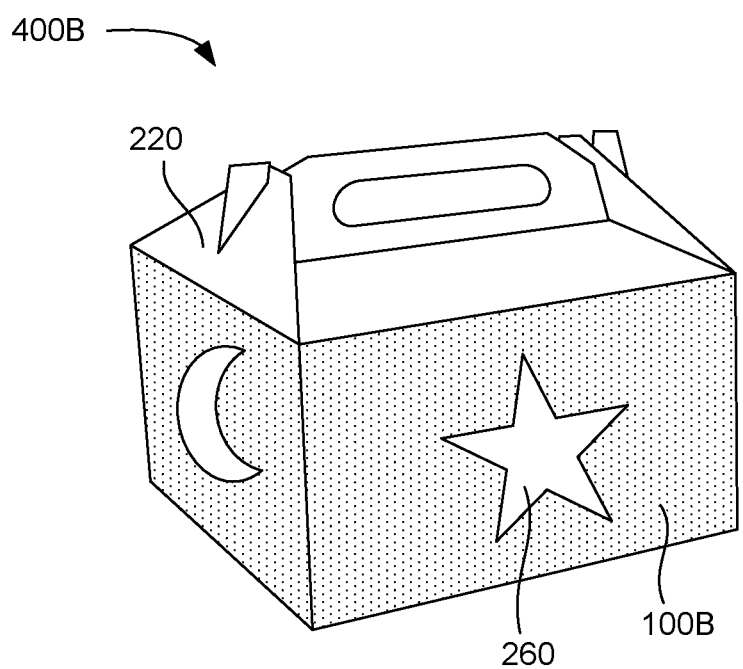
FIG. 4B is a perspective view of an assembled package prepared from the unfolded and scored packing print medium of FIG. 4A in accordance with the present disclosure.

The packaging print medium 200A can be imaged 260 with an ink composition, for example, and the ink composition can interact with the pre-treatment matrix layer so that it can withstand high temperatures and scraping often associated with corrugation processes (as shown in FIG. 3 by way of example) or so that it can withstand rigorous handling often associated with other types of packaging (as shown by way of example in FIG. 4A and FIG. 4B). In one specific example, the media substrate 210, such as an offset coated media substrate, may be coated with the pre-treatment coating composition, which is dried to essentially remove evaporable liquid vehicle (usually including evaporable solvent, water, or both) to leave the pre-treatment matrix layer 100B. The image 260 may then be printed thereon using ink printing technologies, such as digital printing/inkjet printing, and dried. Thus, for definitional purposes, the evaporable aqueous liquid vehicle (or some cases water) is not part of the matrix, as it is removed (or mostly removed within tolerances for printing on the "dried" pre-treatment matrix layer) from the pre-treatment coating composition after application to the media substrate.

In addition to offset media, the pre-treatment coating compositions and matrices of the present disclosure can be suitable for use on many types of other substrates of print media, including but not limited to, paper media, nonporous media, swellable media, microporous media, photobase media, coated media, uncoated media, and other types of media including plastics, vinyl media, fabrics, woven substrate, etc. In certain examples, the substrate can be swellable media or microporous media. As mentioned, offset media can likewise be used.

Also shown in FIG. 2 is a varnish overcoat 270 applied to the printed image 260, and generally also over the pre-treatment matrix layer 100b. Thus, in one example, the packaging print medium can also include a printed image and in some examples, also the varnish overcoat, shown collectively at 200B. In this specific example, the varnish overcoat can likewise be applied directly to the pre-treatment matrix layer where ink has not been applied. The varnish overcoat can be used to protect the printed image and the pre-treatment matrix layer; however it is noted that since all three layers can get very hot during corrugation processing, for example, all three layers can be formulated to withstand a relatively high level of heat for example where heat is used for preparing the packaging. In examples where high temperature processing and/or mechanical pressure or scraping is not used, varnish coatings can be used to provide protection to the printed image, but can also be used to increase the thickness and/or rigidity of the media substrate so that the packaging print medium has a level of stiffness that may be useful for a particular packaging application. Regarding the corrugation examples, it can be the varnish overcoat that may come into direct contact with the hot plate used on the corrugation apparatus. Thus, the varnish may be formulated to withstand direct hot plate contact, which may be the harshest mechanical contact experienced by the varnish coating. At the same time, though a varnish overcoat may be useful in some instances, it is notable that a varnish overcoat may or may not be used, depending on the specific packaging application.

Examples of materials that can be used for the varnish overcoat include polystyrene polymer, polystyrene copolymers, polyacrylate, polystyrene-acrylate copolymers, polyurethane resin, or heat cross-linkable polymers. More specific commercial products that can be used for the varnish overcoat include Digiguard® 100, Thermagloss® 425 from Michelman; Preprint® XDM Gloss OVP 7MKWJ4115 from American Inks and Coatings; or Aquaflex® H. R. Overprint from Flint Group. Suitable thickness for the varnish overcoat can range from 0.5 µm to 5 µm, or from 1 µm to 3 µm, for example.

Returning again to FIG. 2, the printed image 260 can be referred to as printed ink, printed indicia, printed matter, or the like. In this example, the printed image can be applied to a portion of the pre-treatment matrix layer 100B, which may be the case where some areas may be imaged and other areas remain unprinted with ink or coated with a colorless ink, for example. In one example, the printed image can be a pigment-based printed image, and in other examples, the printed image can be a dye-based printed image. These printed images can be applied by inkjet ink or other digital printing technologies, or may be applied by analog printing technologies, for example.

Inkjet inks generally can include a colorant dispersed or dissolved in an ink vehicle. As used herein, "ink vehicle" refers to the liquid fluid in which a colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface- active agents, water, etc. Though not part of the ink vehicle per se, in addition to the colorants, the ink vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance of the formulation can be purified water with other small amounts of other ingredients. In some examples, the inkjet ink may include latex for added durability.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R. T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Turning now to FIG. 3, a packaging print medium 200A is shown as it may be assembled with a flute 310 and a base paper 320 under heat and pressure provided by a heating plate 340 and a pressure back plate 330 to form corrugated packaging 200C that can be printed with an image 260, for example. Thus, in this example, a partial schematic view of a corrugated package is shown for such an assembly. In the example, the packaging print medium is similar to that shown in FIG. 2 at 200A, but is shown inverted. Thus, the packaging print medium includes the media substrate 220 and a pre-treatment matrix layer 100B. A varnish overcoat is not shown in this example, but can be included as shown previously in FIG. 2. In this example, heat and pressure can be applied to an imaged side of the print with a flute medium and a pressure back plate, which back plate also cooperates in applying pressure when preparing the corrugated packaging. In some examples, the flute may also be attached to or may become attached to the base paper, also under heat and pressure, for example. Notably, in this particular example, the corrugated packaging can be moved in direction (d) while under heat and pressure. As a result, the imaged side of the packaging under heat can be scratched or scraped as it moves laterally. The combination of the varnish overcoat (if present), the printed image, and pre-treatment matrix layer can be formulated to withstand the heat and pressure that may be applied during the corrugation process.

Referring now to FIG. 4A and FIG. 4B, an alternative packaging medium is shown at 400A, which can be used for printing an image 260 therein, and then folded or assembled to form an assembled package, shown at 400B. Again, the packaging print medium includes a media substrate 220 and a pre-treatment matrix layer 100B. In this instance, only a portion of the media substrate is coated with the pre-treatment matrix layer, but it could likewise be coated along the full surface shown, if it is intended to allow for printable indicia to be applied at any location along the surface. Furthermore, since this type of packaging is a foldable package, the packaging medium can be prepared to include fold guides or even scoring 410 or other mechanical discontinuity to assist the user in the folding and/or assembly of the packaging. Like the corrugated packaging, the packaging may be printed with any ink composition or printing technology, and then may be further protected by an overcoat varnish in some examples. Furthermore, the overcoat varnish may likewise or alternatively be used to add rigidity to the packaging print medium, particularly where thinner papers may have been used. The application of a discontinuity, as described above, may occur prior to or after application of the varnish, and may occur after.

In another example, as shown in FIG. 5 by way of example, a method 500 of preparing a packaging print medium includes coating 510 a first side of media substrate with a pre-treatment coating composition, and drying 520 the pre-treatment coating to remove evaporable liquid vehicle therefrom to form the pre-treatment matrix layer on the printing side. The pre-treatment coating composition in this example includes evaporable liquid vehicle and a pre-treatment coating matrix. The pre-treatment coating matrix includes from 30 wt % to 70 wt % multivalent organic salt, from 5 wt % to 30 wt % dispersed polyurethane binder having a weight average molecular weight from 30,000 Mw to 100,000 Mw, from 0.5 wt % to 8 wt % of a high molecular weight polyvinyl alcohol binder, and from 10 wt % to 30 wt % of a low molecular weight polyvinyl alcohol binder. The low molecular weight polyvinyl alcohol binder and the high molecular weight polyvinyl alcohol binder in this example are present in the pre-treatment coating matrix at a 3:1 to 15:1 weight ratio. In one example, the method can include attaching a support side of a corrugated flute to a second side of the media substrate. The method can also include attaching a base paper to a base-attachment side of the corrugated flute. Attaching the support side of the corrugated flute to the second side of the media substrate, or attaching the base paper to the base-attachment side of the corrugated flute, or both, may include applying heat and pressure to the print medium, the corrugated flute, and the base paper. The packaging print medium in this example may alternatively be in the form of a foldable packaging media substrate. In some examples, the method can include applying a varnish overcoat over the pre-treatment matrix layer, such as after printing an image on the pre-treatment matrix layer.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate the pre-treatment coating compositions and matrices, and data associated therewith. However, it is to be understood that the following are only exemplary or illustrative of the application of the principles of the present compositions print media, and methods. Numerous modifications and alternative pre-treatment coating compositions or matrices may be devised by those skilled in the art without departing from the spirit and scope of the present compositions and methods. The appended claims are intended to cover such modifications and arrangements. Thus, while the above has been described with some particularity, the following provides further example details.

Example 1

Preparation of Packaging Print Media Coating Compositions

Multiple packaging print media coating compositions were prepared. Some of the packaging print media coating compositions were prepared to determine the effect of individual components in pre-treatment coating compositions (P1-P3), two were prepared in accordance with examples of the present disclosure (P4-P5), and one was prepared as a comparative pre-treatment coating composition (P6). The pre-treatment coating compositions prepared were as follows, as shown in Tables 1A and 1B.

TABLE 1A

Pre-treatment Coating Compositions (wt % solids)

| | | Coating ID | | |
|---|---|---|---|---|
| Ingredient | Category | P1 | P2 | P3 |
| Poval ™ 4-88 | Low Mw PVA (31,000 Mw) | 10.4 | 10.4 | 10.4 |
| Poval ™ 13-88 | High Mw PVA (110,000 Mw) | 15.6 | 15.6 | 15.6 |
| Orgasol ® 2002 EXD NAT 1 Wax | Polyamide Wax | 15.6 | 15.6 | 15.6 |
| PrintRite ® DP-388 | Polyurethane | 15.6 | 15.6 | 15.6 |
| Tego ® Wet 510 | Surfactant | 0.8 | 0.8 | 0.8 |
| Disperbyk ® 190 | Surfactant | | | |
| BYK ® 018 | Defoamer | 3.2 | 3.2 | 3.2 |
| Calcium Chloride | Multivalent Inorganic Salt | 38.9 | | |
| Calcium Acetate | Multivalent Organic Salt | | 38.9 | |
| Calcium Propionate | Multivalent Organic Salt | | | 38.9 |

TABLE 1B

Pre-treatment Coating Compositions (wt % solids)

| Ingredient | Category | Coating ID P4 | P5 | P6 (comp) | P7 (comp) |
|---|---|---|---|---|---|
| Poval™ 4-88 | Low Mw PVA (31,000 Mw) | 15.35 | 15.35 | 10.35 | 4.58 |
| Poval™ 13-88 | High Mw PVA (110,000 Mw) | 1.92 | 1.92 | — | 13.75 |
| Orgasol® 2002 EXD NAT 1 Wax | Polyamide (PA) Wax | — | — | — | — |
| Ultralube Wax | Polyethylene Wax | — | — | — | 9.17 |
| PrintRite® DP-388 | Polyurethane | 23.03 | 23.03 | 15.53 | 20.63 |
| Tego® Wet 510 | Surfactant | — | — | 0.777 | — |
| Disperbyk® 190 | Surfactant | 0.77 | 0.77 | — | 0.69 |
| BYK® 018 | Defoamer | 1.15 | 1.15 | 3.236 | 2.86 |
| Calcium Chloride | Multivalent Inorganic Salt | — | — | 38.83 | — |
| Calcium Acetate | Multivalent Organic Salt | 57.79 | — | — | 48.13 |
| Calcium Propionate | Multivalent Organic Salt | — | 57.79 | — | — |
| Acticide® B20 | Biocide | 0.14 | 0.14 | 0.155 | 0.14 |
| Acticide® M20 | Biocide | 0.05 | 0.05 | 0.057 | 0.05 |

In Tables 1A and 1B:

Ingredients shown in weight percent solids. Water to solids content ratio is about 2.6:1 for P4 and P5, and about 3:1 for P1, P2, P3, and P6.

Poval™ is available from Kuraray (USA) (formerly "Mowiol" from Clariant).

Orgasol® is a nylon-based wax available from Arkema (France).

PrintRite® DP-388 is available from available from Lubrizol (USA).

Tego® is available from Evonik Industries AG (Germany).

Disperbyk® and BYK® are available from BYK-Chemie GmbH (Germany).

Acticide® is available from Thor (USA).

Figure 6:
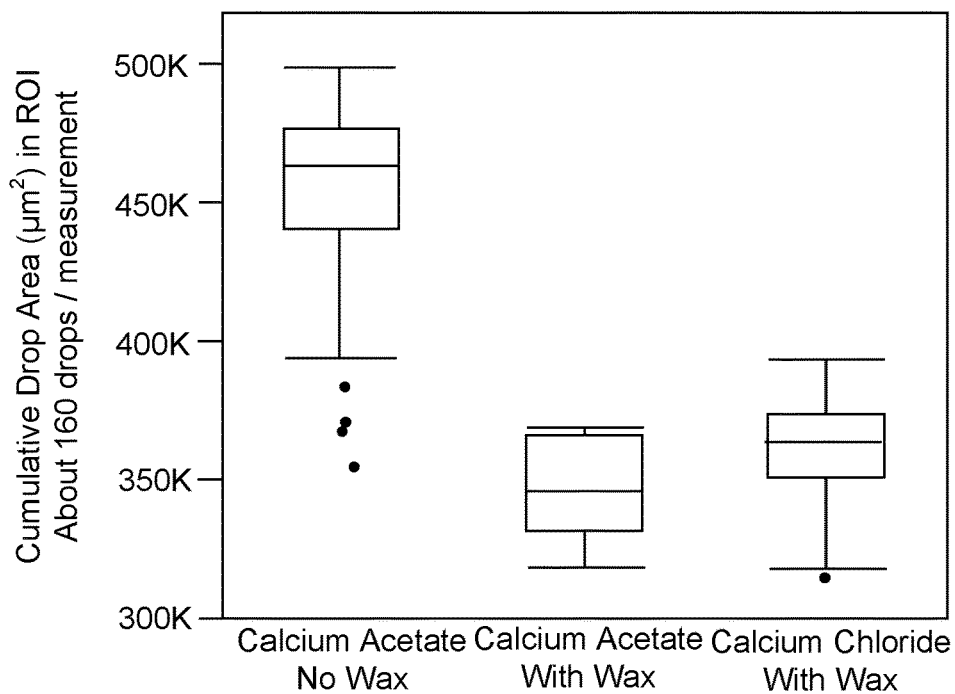
FIG. 6 is an example graph illustrating the effect of multivalent salt choice (with and without wax) for inclusion in a pre-treatment coating composition and a pre-treatment matrix layer as it relates to dot gain in accordance with the present disclosure.

*Two comparative pre-treatment coating compositions were prepared, using either a polyamide wax for most examples, or a polyethylene wax for the data found in FIG. 6.

Example 2

Application of Pre-treatment Coating Compositions Onto Media Substrates for Print Quality and Durability Evaluation The various pre-treatment coatings (P1-P6) may be applied using any of a number of coating application devices on various packaging media substrates. However, for purposes of evaluation of P1-P6 image quality and durability in the present examples, an HP PageWide T400S Packaging Web Press, equipped with an inline pre-coater and post-print varnish coater was used. In the present examples, the equipment primes the print media (Kemi Graph Plus 38#) with one of the pre-treatment coating compositions (P1-P6) to form a pre-treatment matrix layer (ca. 0.4 gsm), then dries it, prints ink on the pre-treating coating matrix applied to the print media, then dries it, varnishes (or V1) the printed image, if applicable, with Digiguard 520IJ varnish (V1) available from Michelman (USA), and then dries the final product leaving a pre-treatment matrix layer on the media substrate.

Example 3

Durability and Image Quality Performance Comparison of Pre-Treatment Coatings with Multivalent Inorganic Salt vs. Multivalent Organic Salt To determine if there would be an advantage of using a multivalent organic salt compared to an inorganic multivalent salt with respect to image quality and/or durability, print media samples coated with pre-treatment coating compositions P1-P3 were compared for gamut and 75 degree gloss (for image quality) and Sutherland or hot rub testing (for durability).

Gamut was measured using a GretagMacBeth Spectrolino Spectroscan Spectrophotometer based on 816 colors. 75 degree gloss (no units) was measured using BYK Gardiner 75° Micro-TRI-Glossmeter based on an average of eight (8) colors, namely cyan, magenta, yellow, black, red, green, blue, and sheet white. For both gamut and gloss, the higher the value, the better the image quality.

Sutherland Rub durability was measured on prints without varnish using a Sutherland Rub Tool. In this test, a pre-coated unprinted sheet is rubbed against a printed sheet of a given color applying 4 pounds of weight over 200 rub cycles. The lack of damage in this test reflects the degree of ink to pre-coated-paper adhesion, which is a value determined without the benefit of protective varnish. Sutherland Rub Durability scores were based on the average of six (6) printed colors (cyan, magenta, yellow, black, orange, and violet). On the other hand, Hot Rub durability is measured by heating a hot plate to 400° F. and dragging the sample (printed, varnished surface) against the hot plate with a single-face material along the back, and applying 0.5 psi pressure to the print surface to simulate the hot corrugation process. Hot Rub durability scores were based on the average of six (6) printed colors (cyan, magenta, yellow, black, orange, and violet), or alternatively based on two printed colors (black and red).

TABLE 2

Image Quality and Durability

| Coating ID | Varnish | Gamut | 75° Gloss | Sutherland Durability (Six Color) | Hot Rub Durability (Six Color) | Hot Rub Durability (Two Color) |
|---|---|---|---|---|---|---|
| Experiment 1 | | | | | | |
| P1 | — | 267059 | 57.4 | 1 | — | — |
| P2 | — | 300410 | 65.0 | 4 | — | — |
| P3 | — | 296956 | 62.4 | — | — | — |
| Experiment 2 | | | | | | |
| P1 | V1 | 399870 | 71.4 | — | — | 2 |
| P2 | V1 | 401816 | 73.8 | — | — | — |
| P3 | V1 | 416985 | 76.4 | — | — | 4 |
| Experiment 3 | | | | | | |
| P4 | V1 | — | — | — | 4.5 | — |
| P6 | V1 | — | — | — | 2 | — |

Thus, this data showed that with respect to gamut, gloss, and hot rub durability, with varnish (Experiment 2) and without varnish (Experiment 1), the use of multivalent organic salt (both P2 calcium acetate and P3 calcium propionate) outperformed inorganic multivalent salt (P1 CaCl$_2$). Experiment 3 is discussed in Example 4 below.

Example 4

Multivariable Image Quality and Durability Comparison

As both calcium acetate (coating P2) and the calcium propionate (coating P3) both outperformed calcium chloride (coating P1), the formulations were further modified to try to improve the pre-treatment coating composition characteristics further. For example, pre-treatment coating P4 was prepared and compared to a comparative pre-treatment coating P6, as outlined in Table 1B above. Notably pre-treatment coating P6 is very similar to P3, but P6 includes slightly modified weight percentages and a small concentration of added biocide. Furthermore, pre-treatment coating P5 (also in Table 1B) can also be prepared with similar results. No comparative data is provided for this pre-treatment coating composition, as Example 3 has demonstrated that both multivalent organic salts improved gamut, gloss, and hot rub durability comparably relative to calcium chloride.

Comparative pre-treatment coating P6 was different than the pre-treatment coating P4 in that pre-treatment coating P6 included: (i) low molecular weight polyvinyl alcohol and high molecular weight polyvinyl alcohol outside of the presently disclosed ratio of 3:1 to 15:1, and (ii) multivalent inorganic salt (CaCl$_2$) rather than a multivalent organic salt. Furthermore, though either surfactant choice can be used in the example formulations of the present disclosure, Disperbyk® 190 was used in C1 and Tego® Wet 510 was used in P6. It has been found that Disperbyk® 190 tends to provide better results than Tego® Wet 510, so P4 was prepared by Disperbyk® 190. Furthermore, though wax can be used in pre-treatment coating P4 with good success, removal of the wax in combination with the polyurethane particles, the ratio of polyvinyl alcohol (low to high Mw), and the multivalent organic salt can still provide good durability, but can provide the added benefit of improved image quality which is manifest in this example by dot gain.

The following data relates to a direct comparison of pre-treatment coating P4 in accordance with the present disclosure vs. comparative pre-treatment coating P6. Samples were prepared in accordance with the details in Example 2, and hot rub durability was tested in accordance with the details in Example 3. However, in these examples, dot gain (rather than gamut and gloss) was evaluated for image quality.

Regarding hot rub durability, pre-treatment coating P4 significantly outperformed pre-treatment coating P6, as shown in Table 2, Experiment 3, even though pre-treatment coating P4 did not include wax. Thus, good durability can be achieved without the use of wax. Removal of wax from the pre-treatment coatings described herein can provide other image quality benefits, as demonstrated by the following drop area and dot gain data, which is present in FIGS. 6-10.

Drop gain or drop area refers to the area of ink that is colored upon application of an ink composition to a media substrate. If an ink tends to spread, then there can be more ink coverage, leading to richer colors or the ability to apply less ink to get acceptable ink coverage.

FIG. 6 demonstrates the effect of multivalent salt choice on a pre-treatment matrix layer (with and without wax). In this example, a T400S Packaging Web Press, similar to that described in Example 2, was used but the speed was set to 600 fpm instead of 400 fpm. In this FIG., the pre-treatment matrix layer with calcium acetate (no wax) was from pre-treatment coating composition P4; the pre-treatment matrix layer with calcium acetate and wax was not the same, but similar to that from pre-treatment coating composition P4. This layer further included a polyethylene wax; and the pre-treatment matrix layer with calcium acetate and wax was similar to that from pre-treatment coating composition P6, except that a polyethylene wax was included instead of the polyamide (Nylon-based) wax (pre-treatment coating P7).

Figure 7:
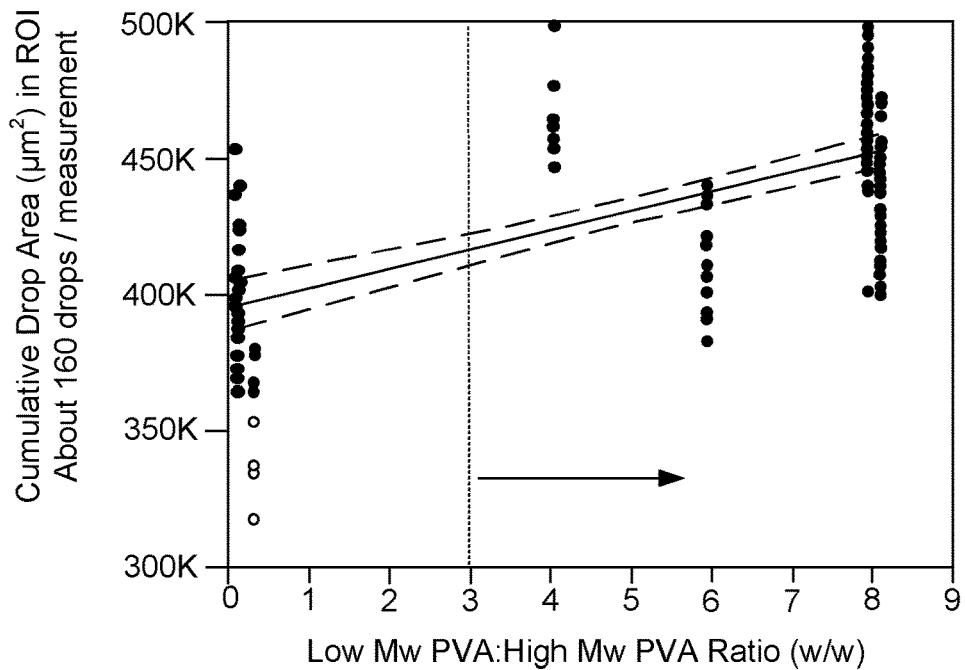
FIG. 7 is an example graph illustrating the effect of the ratio of low molecular weight PVA to high molecular weight PVA on dot gain on a pre-treatment matrix layer in accordance with the present disclosure.

FIG. 7 demonstrates the effect of the ratio of low molecular weight PVA to high molecular weight PVA on dot gain. The cumulative dot area and number of black dots (black ink drops on paper) were measured in an area with a fixed, low ink density, in a region of interest (ROI) under a Keyence VHX-6000 digital microscope using a 150× lens. The ROI was fixed at 4124972 $\Box m^2$ in all cases, and all the large ink dots in this ROI, typically ca. 160, were counted and sized, excluding small satellite drops. In this instance, the T400S Packaging WebPress was operated at a variety of speeds ranging from 400 fpm to 800 fpm, and the data collected is shown in this FIG. The trend line shows that dot gain can be increased with a greater weight ratio of low molecular weight PVA relative to high molecular weight PVA. At about 3:1 (shown as the vertical dotted line) and greater, e.g., 3:1 to 15:1, 3:1 to 8:1 (as shown), etc., can be enough improvement to provide an appreciably enhancement in dot gain relative to lower ratios. In the formulations of FIG. 7, the pre-treatment coating compositions were prepared similar to P4, all using calcium acetate as salt, all devoid of wax, but with modification of the low to high Mw PVA weight ratios.

Figure 8:
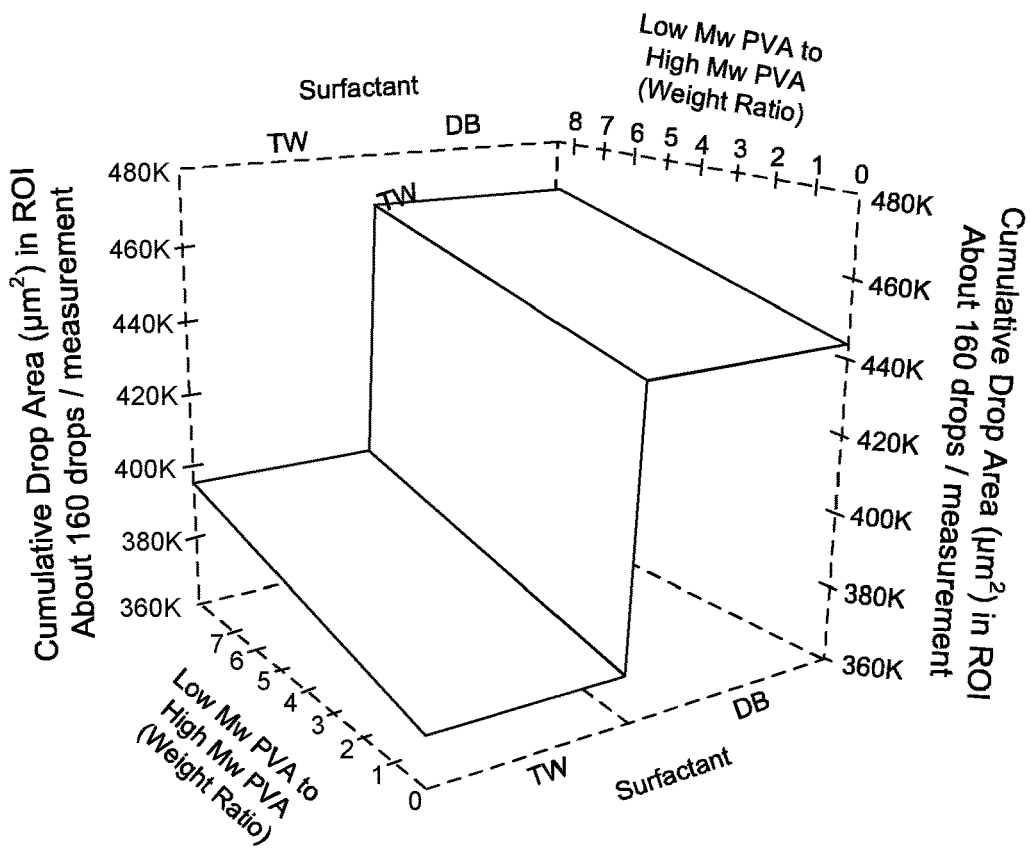
FIG. 8 is an example three-dimensional graph showing how polyvinyl alcohol weight ratio (low Mw to high Mw) and surfactant choice can both impact drop dot gain on a pre-treatment matrix layer in accordance with the present disclosure.

FIG. 8 is a three dimensional graph showing how polyvinyl alcohol weight ratio (low Mw to high Mw) and surfactant choice can both impact drop area or dot gain. In this example, the use of Disperbyk® 190 (DB in FIG.) outperformed Tego® Wet 510 (TW in FIG.) with respect to dot gain. Likewise, a higher weight ratio of low Mw polyvinyl alcohol to high Mw polyvinyl alcohol improved dot gain performance as well. In this instance, the T400S Packaging WebPress was operated at 600 fpm.

Figure 9:
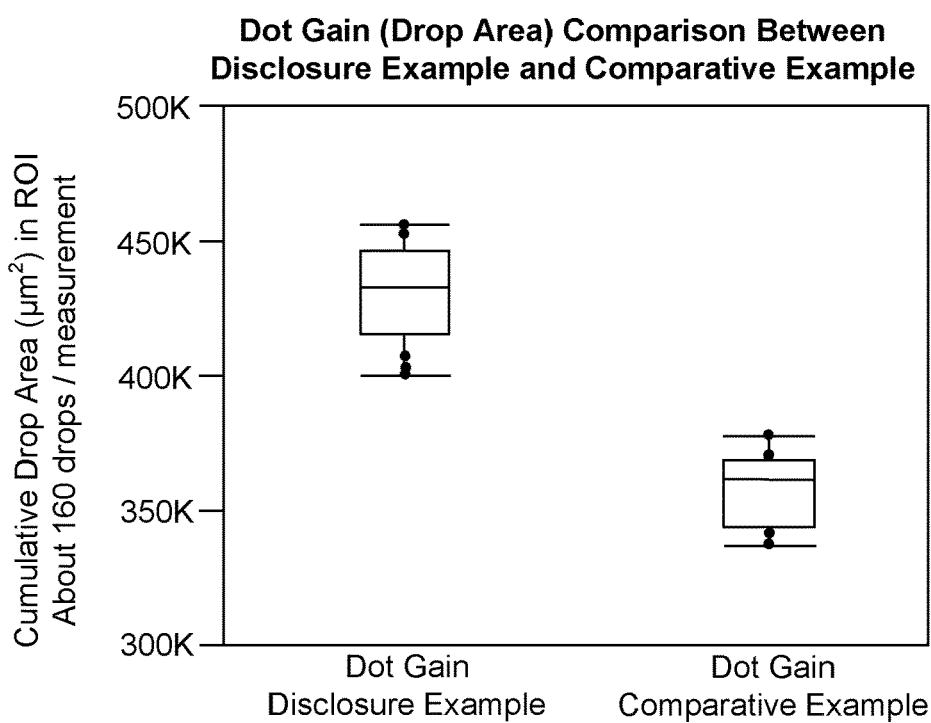
FIG. 9 is an example graph that provides dot gain or drop area data for a pre-treatment matrix layer against a comparative pre-treatment matrix layer in accordance with the present disclosure.
Figure 10:
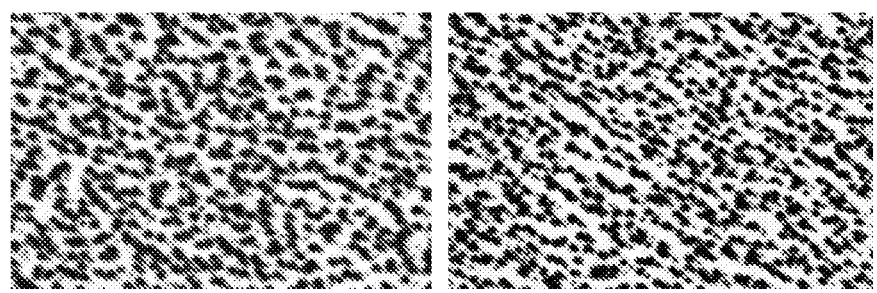
FIG. 10 provides the raw images at a medium ink density with two different pre-treatment matrix layers with the dot gain is shown in FIG. 9 in accordance with the present disclosure.

FIG. 9 illustrates dot gain or drop area data for pre-treatment coating composition P4 compared to the comparative pre-treatment coating composition (P6). The raw imaging data used to collect the dot gain data is shown by way of example in FIG. 10. Similar raw images at low ink density were used to report the dot gain data of FIG. 9. As can be seen in FIG. 10, though the same volume of ink was deposited (9 pL per drop drop), the pre-treatment matrix layer formed from coating composition P4 did a better job spreading the deposited ink drops to a larger area of the packaging print media. In this example, the T400S Packaging WebPress was operated at 600 fpm.

Example 5

Multivariable Hot Rub Durability Comparison

Additional Hot Rub durability data was collected from six (6) additional pre-coating composition samples (P8-P13). In this comparison, the dispersed polyurethane concentration (6 wt %) and the salt concentration (15 wt %) was kept constant, but two different salts were evaluated, namely calcium acetate and calcium chloride. Furthermore, Disperbyk® 198 (0.3 wt %) and Tego® Wet 510 (0.2 wt %) were swapped back and forth to evaluated differences. The ratio of low molecular weight to high molecular weight polyvinyl alcohol was also modified, with four samples at an 8:1 weight ratio, and seven comparative examples below a 3:1 weight ratio. The pre-treatment coating composition was applied to leave a 0.4 gsm dry pre-treatment matrix layer on the packaging media substrate. Hot Rub durability was measured as described in Example 3, with Michelman Digiguard 520 IJ varnish applied at 1 gsm by dry weight. Hot Rub durability scores for seven (7) colors (black, cyan, magenta, red, green, blue, and violet) is provided in Tables 3A-3B below, with an average score also provided. A score of 5 is the best, and a score of 1 is the worst. Less than 2 is failing; from 2 to less than 3 is marginal; from 3 to less than 4 is good; and from 4 to 5 is excellent durability.

TABLE 3A

Pre-treatment Coating Compositions (parts by weight)

| | | Coating ID | | |
|---|---|---|---|---|
| Ingredient | Category | P8 | P9 | P10 |
| Poval ™ 4-88 | Low Mw PVA (31,000 Mw) | 4 | 4 | 4 |
| Poval ™ 13-88 | High Mw PVA (110,000 Mw) | 0.5 | 0.5 | 6 |
| Orgasol ® 2002 EXD NAT 1 Wax | Polyamide Wax | — | 6 | 6 |
| PrintRite ® DP-388 | Polyurethane | 6 | 6 | 6 |
| Tego ® Wet 510 | Surfactant | — | — | 0.3 |
| Disperbyk ® 190 | Surfactant | 0.2 | 0.2 | — |
| BYK ® 018 | Defoamer | 0.3 | 0.3 | 1.25 |
| Calcium Chloride | Multivalent Inorganic Salt | — | — | — |
| Calcium Acetate | Multivalent Organic Salt | 15 | 15 | 15 |
| Sum of Parts | | 26 | 32 | 38.55 |
| Low Mw to High Mw Weight Ratio PVA | | 8:1 | 8:1 | 0.67:1 |
| Hot Rub Individual Ink Composition Score (5 = Best; 1 = Worst) | Black | 5 | 5 | 5 |
| | Cyan | 4.5 | 5 | 3 |
| | Magenta | 5 | 5 | 5 |
| | Red | 5 | 3.5 | 3.5 |
| | Green | 5 | 3.5 | 3.5 |
| | Blue | 2.5 | 2 | 1.5 |
| | Violet | 4 | 2 | 1 |
| Hot Rub Average Ink Set Score (5 = Best; 1 = Worst) | Mean Score | 4.2 | 3.7 | 3.1 |

TABLE 3B

Pre-treatment Coating Compositions (parts by weight)

| | | Coating ID | | |
|---|---|---|---|---|
| Ingredient | Category | P11 | P12 | P13 |
| Poval ™ 4-88 | Low Mw PVA (31,000 Mw) | 4 | 4 | 4 |
| Poval ™ 13-88 | High Mw PVA (110,000 Mw) | 6 | 6 | 0.5 |
| Orgasol ® 2002 EXD NAT 1 Wax | Polyamide Wax | 6 | — | — |
| PrintRite ® DP-388 | Polyurethane | 6 | 6 | 6 |
| Tego ® Wet 510 | Surfactant | 0.3 | 0.3 | — |
| Disperbyk ® 190 | Surfactant | — | — | 0.2 |
| BYK ® 018 | Defoamer | 1.25 | 1.25 | 1.25 |
| Calcium Chloride | Multivalent Inorganic Salt | 15 | 15 | 15 |
| Calcium Acetate | Multivalent Organic Salt | — | — | — |
| Sum of Parts | | 38.55 | 32.55 | 26 |
| Low Mw to High Mw Weight Ratio PVA | | 0.67:1 | 0.67:1 | 8:1 |
| Hot Rub Individual Ink Composition Score (5 = Best; 1 = Worst) | Black | 2 | 2 | 5 |
| | Cyan | 1 | 1 | 1 |
| | Magenta | 3 | 5 | 5 |
| | Red | 2 | 2 | 2.5 |
| | Green | 1 | 1 | 2 |
| | Blue | 1 | 1 | 1 |
| | Violet | 1 | 1 | 1 |
| Hot Rub Average Ink Set Score (5 = Best; 1 = Worst) | Mean Score | 1.6 | 1.9 | 2.5 |

As can be seen in Tables 3A and 3B, pre-treatment coating compositions P8 and P9 were prepared in accordance with examples of the present disclosure, containing dispersed polyurethane particles, a ratio of low Mw PVA to high Mw PVA within the range of 3:1 to 15:1, and a multivalent organic salt. Furthermore, P8 was prepared in accordance with some more detailed aspects of the present disclosure, e.g., excluding the presence of the wax (which is often used to increase durability). It was interesting to note that the durability of the formulation without wax outperformed the formulation with wax. However, as can be seen by the data presented, P8 and P9 both outperformed P10-P13 with respect to durability, and in the context of the presently disclosed pre-treatment coating compositions and matrix layers formed therefrom, and P8 slightly outperformed P9 with respect to Hot Rub durability.

What is claimed is:
1. A pre-treatment coating composition, comprising:
an evaporable liquid vehicle; and
a pre-treatment coating matrix carried within the evaporable liquid vehicle, the pre-treatment coating matrix, comprising:
from 30 wt % to 70 wt % multivalent organic salt,
from 5 wt % to 30 wt % dispersed polyurethane binder having a weight average molecular weight from 30,000 Mw to 100,000 Mw,
from 0.5 wt % to 8 wt % of a high molecular weight polyvinyl alcohol binder, and
from 10 wt % to 30 wt % of a low molecular weight polyvinyl alcohol binder,
wherein the low molecular weight polyvinyl alcohol binder and the high molecular weight polyvinyl alcohol binder are present in the pre-treatment coating matrix at a 3:1 to 15:1 weight ratio, and wherein weight percentages are based on dry weight of the pre-treatment coating matrix.
2. The pre-treatment coating composition of claim 1, wherein the multivalent organic salt includes a divalent metal selected from calcium, magnesium, iron, aluminum, zinc, or a mixture thereof, and wherein the multivalent organic salt includes an organic anion having the formula RCOO⁻, where R is hydrogen or a C1 to C12 saturated hydrocarbon.

3. The pre-treatment coating composition of claim 2, wherein the organic anion is an acetate anion, a propionate anion, or a combination thereof.

4. The pre-treatment coating composition of claim 1, wherein the dispersed polyurethane binder has a weight average molecular weight from 40,000 Mw to 70,000 Mw.

5. The pre-treatment coating composition of claim 1, wherein the pre-treatment coating matrix is devoid of wax.

6. The pre-treatment coating composition of claim 1, further comprising a block copolymer surfactant that stabilizes components of the pre-treatment coating matrix by steric hindrance, and having a weight average molecular weight from 4,000 Mw to 12,000 Mw with an acid value from 5 mg KOH/g to 30 mg KOH/g.

7. A packaging print medium, comprising:
a media substrate including a first side and a second side; and
a pre-treatment matrix layer on a first side of the media substrate, the pre-treatment matrix layer, comprising:
from 30 wt % to 70 wt % multivalent organic salt,
from 5 wt % to 30 wt % dispersed polyurethane binder having a weight average molecular weight from 30,000 Mw to 100,000 Mw,
from 0.5 wt % to 8 wt % of a high molecular weight polyvinyl alcohol binder, and
from 10 wt % to 30 wt % of a low molecular weight polyvinyl alcohol binder,
wherein the low molecular weight polyvinyl alcohol binder and the high molecular weight polyvinyl alcohol binder are present in the pre-treatment matrix layer at a 3:1 to 15:1 weight ratio, and wherein weight percentages are based on dry weight of the pre-treatment matrix layer.

8. The packaging print medium of claim 7, wherein the multivalent organic salt includes a divalent metal selected from calcium, magnesium, iron, aluminum, zinc, or a mixture thereof, and wherein the multivalent organic salt includes an organic anion having the formula RCOO⁻, where R is hydrogen or a C1 to C12 saturated hydrocarbon.

9. The packaging print medium of claim 7, wherein the polyurethane binder includes a polyurethane polymer having a weight average molecular weight from 30,000 Mw to 100,000 Mw, and wherein the pre-treatment matrix layer is devoid of wax.

10. The packaging print medium of claim 7, further comprising a corrugated flute having a support side attached to the second side of the media substrate and a base-attachment side attached to base paper, wherein the print medium is in the form of a corrugated print medium that has been treated under heat and pressure.

11. A method of preparing a packaging print medium, comprising:
coating a first side of media substrate with a pre-treatment coating composition, the pre-treatment coating composition comprising an evaporable liquid vehicle and a pre-treatment coating matrix carried within the evaporable liquid vehicle, the pre-treatment coating matrix, comprising:
from 30 wt % to 70 wt % multivalent organic salt,
from 5 wt % to 30 wt % dispersed polyurethane binder having a weight average molecular weight from 30,000 Mw to 100,000 Mw,
from 0.5 wt % to 8 wt % of a high molecular weight polyvinyl alcohol binder, and
from 10 wt % to 30 wt % of a low molecular weight polyvinyl alcohol binder,
wherein the low molecular weight polyvinyl alcohol binder and the high molecular weight polyvinyl alcohol binder are present in the pre-treatment coating matrix at a 3:1 to 15:1 weight ratio, and wherein weight percentages are based on dry weight of the pre-treatment coating matrix; and
drying the pre-treatment coating composition to remove evaporable liquid vehicle therefrom to form a pre-treatment matrix layer on the printing side.

12. The method of claim 11, further comprising attaching a support side of a corrugated flute to a second side of the media substrate, and further comprising attaching a base paper to a base-attachment side of the corrugated flute.

13. The method of claim 12, wherein attaching the support side of the corrugated flute to the second side of the media substrate, attaching the base paper to the base-attachment side of the corrugated flute, or both includes applying heat and pressure to the print medium, the corrugated flute, and the base paper.

14. The method of claim 11, wherein the media substrate is a foldable packaging media substrate.

15. The method of claim 11, further comprising applying a varnish overcoat over the pre-treatment matrix layer after an ink composition is applied to the pre-treatment matrix layer.

* * * * *